United States Patent
Kalantri

(10) Patent No.: US 11,736,473 B2
(45) Date of Patent: Aug. 22, 2023

(54) IDENTIFIERS AND ACCESS TOKENS FOR PRIVACY IN CENTRALIZED ADDRESS MANAGEMENT

(71) Applicant: Saurabh Shriniwas Kalantri, San Diego, CA (US)

(72) Inventor: Saurabh Shriniwas Kalantri, San Diego, CA (US)

(*) Notice: Subject to any disclaimer, the term of this patent is extended or adjusted under 35 U.S.C. 154(b) by 258 days.

(21) Appl. No.: 17/220,331

(22) Filed: Apr. 1, 2021

(65) Prior Publication Data

US 2021/0314308 A1  Oct. 7, 2021

Related U.S. Application Data

(60) Provisional application No. 63/003,739, filed on Apr. 1, 2020.

(51) Int. Cl.
*H04L 29/00* (2006.01)
*H04L 9/40* (2022.01)
*H04L 67/06* (2022.01)
*H04L 51/42* (2022.01)

(52) U.S. Cl.
CPC ............ *H04L 63/083* (2013.01); *H04L 51/42* (2022.05); *H04L 63/0236* (2013.01); *H04L 63/102* (2013.01); *H04L 63/20* (2013.01); *H04L 67/06* (2013.01)

(58) Field of Classification Search
CPC ... H04L 63/083; H04L 51/42; H04L 63/0236; H04L 63/102; H04L 63/20; H04L 67/06; H04L 51/48; G06Q 10/10
See application file for complete search history.

(56) References Cited

U.S. PATENT DOCUMENTS

| | | | |
|---|---|---|---|
| 8,905,304 B1* | 12/2014 | Daniel | G06Q 20/363 235/380 |
| 9,424,548 B1* | 8/2016 | Siegel | G06Q 10/08355 |
| 10,366,784 B1* | 7/2019 | Eller | G16H 10/60 |
| 10,999,425 B2* | 5/2021 | Kim | H04M 3/4931 |
| 2003/0097331 A1* | 5/2003 | Cohen | G06Q 20/108 705/42 |
| 2006/0031357 A1* | 2/2006 | Misra | H04L 51/42 709/206 |
| 2010/0100233 A1* | 4/2010 | Lu | B07C 3/18 700/226 |
| 2010/0268754 A1* | 10/2010 | Holton | H04L 51/214 709/227 |
| 2010/0281529 A1* | 11/2010 | Krause | G06Q 20/382 726/7 |

(Continued)

FOREIGN PATENT DOCUMENTS

CN 101524685 A * 9/2009

*Primary Examiner* — Don G Zhao
(74) *Attorney, Agent, or Firm* — Procopio, Cory, Hargreaves & Savitch

(57) ABSTRACT

Identifiers and access tokens for privacy in centralized address management. In an embodiment, address information may be associated with a unique address identifier that can be used in place of the address information. For example, a user may register an address with his or her user account using the address identifier, rather than the address information. In addition, an organization may utilize the address identifier to obtain an access token that enables communication with the user at the associated address information.

15 Claims, 7 Drawing Sheets

(56) References Cited

U.S. PATENT DOCUMENTS

| | | | |
|---|---|---|---|
| 2011/0053559 A1* | 3/2011 | Klein | G07C 13/00 235/386 |
| 2012/0185542 A1* | 7/2012 | Vyrros | H04L 65/1069 709/206 |
| 2013/0198300 A1* | 8/2013 | Briggman | G06Q 10/1093 709/206 |
| 2015/0058214 A1* | 2/2015 | Cohen | G06Q 20/10 705/41 |
| 2015/0381562 A1* | 12/2015 | Efrati | H04L 61/4594 455/415 |
| 2017/0048250 A1* | 2/2017 | Gifford | H04L 63/102 |
| 2018/0176221 A1* | 6/2018 | Zhou | H04W 4/21 |
| 2018/0295153 A1* | 10/2018 | Eisen | H04L 63/0236 |
| 2018/0314996 A1* | 11/2018 | Singh | G06Q 50/265 |
| 2019/0196682 A1* | 6/2019 | Madafferi | G06Q 30/06 |
| 2019/0213820 A1* | 7/2019 | Sebes | G07C 13/00 |
| 2020/0067922 A1* | 2/2020 | Avetisov | H04L 9/3247 |
| 2020/0145528 A1* | 5/2020 | Lee | H04M 1/27453 |
| 2020/0210956 A1* | 7/2020 | de Malzac de Sengla | H04L 51/212 |
| 2020/0252469 A1* | 8/2020 | Whiting | H04W 4/33 |
| 2021/0110343 A1* | 4/2021 | Lagneaux | G06F 18/2321 |

* cited by examiner

IDENTIFIERS AND ACCESS TOKENS FOR PRIVACY IN CENTRALIZED ADDRESS MANAGEMENT

CROSS-REFERENCE TO RELATED APPLICATIONS

This application claims priority to U.S. Provisional Patent App. No. 63/003,739, filed on Apr. 1, 2020, which is hereby incorporated herein by reference as if set forth in full.

BACKGROUND

Field of the Invention

The embodiments described herein are generally directed to centralized address management, and, more particularly, to privacy in centralized address management using address identifiers and access tokens.

Description of the Related Art

When a person moves to a new address, the person must generally update his or her address in many different systems and with many different organizations (e.g., government agencies, banks, e-commerce platforms, etc.). This can be a very time-consuming task, and people frequently forget to update their addresses—let alone, with every organization that has their old addresses. As a result, important mail may leak to their old addresses.

It would be advantageous to have a platform for centralized address management, such that a user only needs to update his or her address once with the platform, instead of multiple times for multiple organizations. It would also be advantageous if the platform utilized features that ensured the privacy of users.

SUMMARY

Accordingly, systems, methods, and non-transitory computer-readable media are disclosed for using address identifiers and access tokens to ensure privacy in a centralized address management platform.

In an embodiment, a method is disclosed that comprises using at least one hardware processor to: receive an indication for an address registration by a first user account; in response to receiving the indication, provide one or more inputs for inputting address information or inputting an address identifier; when address information is input, initiating an address verification process, generating a unique address identifier, associating the unique address identifier with the address information, and associating the unique address identifier with the first user account; and when an address identifier is input, initiating a linking confirmation process to obtain an approval or a denial, and, when the approval is obtained from the linking confirmation process, associating the input address identifier with the first user account.

The linking confirmation process may comprise: retrieving a second user account that is associated with the input address identifier; requesting the approval or the denial from a user of the second user account; and receiving the approval or the denial from the user of the second user account.

The method may further comprise using the at least one hardware processor to: receiving a change to the address information; and associating the unique address identifier with the changed address information without changing the unique address identifier.

The method may further comprise using the at least one hardware processor to: receive an access request, comprising an address identifier, from a second user account; retrieve a user account associated with the address identifier in the access request; initiating an access request process to obtain an approval or a denial of the access request; generate an access token; associate the access token with the address identifier in the access request; and, when the approval of the access request is obtained, send the access token to the second user account. The access request may be received via an application programming interface (API). The access token may be sent via an application programming interface (API). The access request process may comprise: retrieving a user account that is associated with the address identifier in the access request; requesting the approval or the denial of the access request from a user of the retrieved user account; and receiving the approval or the denial of the access request from the user of the retrieved user account. The method may further comprise using the at least one hardware processor to: after receiving the approval of the access request and sending the access token to the second user account, receive an indication to revoke the access token from the user of the retrieved user account; and, in response to receiving the indication to revoke the access token, invalidate the access token such that future usage of the access token is prohibited.

The method may further comprise using the at least one hardware processor to: receive a consumption request, comprising the access token, from the second user account; when the access token is valid, retrieve an address identifier associated with the access token, retrieve address information associated with the address identifier, and send the address information to the second user account in response to the consumption request; and, when the access token is invalid, notify the second user account that the consumption request was denied.

The method may further comprise using the at least one hardware processor to: receive a mail request, comprising the access token and one or more items of digital mail, from the second user account; when the access token is valid, retrieve the address identifier associated with the access token, retrieve the user account associated with the address identifier, and deliver the one or more items of digital mail to the retrieved user account associated with the address identifier; and, when the access token is invalid, block delivery of the one or more items of digital mail, and notify the second user account that the mail request was denied.

The digital mail may be associated with one or more actions, wherein delivering the one or more items to the retrieved user account comprises displaying the digital mail and one or more inputs for completing the associated one or more actions in a graphical user interface for the retrieved user account, and wherein the method further comprises using the at least one hardware processor to: receive completion of the one or more actions, via the one or more inputs, from a user of the retrieved user account; and send data derived from the completion of the one or more actions to the second user account.

Delivering the one or more items to the retrieved user account may comprise displaying the digital mail, wherein the method further comprises using the at least one hardware processor to: record a dwell time indicating a duration that the digital mail is displaying; and sending the recorded dwell time to the second user account.

In an embodiment, the unique address identifier is not be generated until after the address information is verified by the address verification process. Alternatively, the unique address identifier may be generated prior to the address information being verified by the address verification process, wherein the unique address identifier is associated with a status, and wherein the method further comprises using the at least one hardware processor to: prior to the address information being verified, set the status to indicate that verification is pending; when the address information is verified, set the status to indicate that the address information is verified; and when the address information is not verified, set the status to indicate that the address information was not verified.

The address verification process may comprise: receiving an upload of an electronic document; extracting a name and address information from the electronic document; and in a first comparison, comparing the extracted name to a name associated with the first user account; in a second comparison, comparing the extracted address information to the address information that was input; verifying the address information that was input when both the first comparison and the second comparison result in a match; and not verifying the address information that was input when either the first comparison does not result in a match or the second comparison does not result in a match.

The address verification process may comprise: initiating printing of a code and mailing of the printed code to the address information; receiving an input code from a user of the first user account; comparing the input code to the code that was printed; verifying the address information when the input code matches the code that was printed; and not verifying the address information when the input code does not match the code that was printed.

The address verification process may comprise: scheduling a visitation between a user of the first user account and an agent; receiving an indication from the agent via a graphical user interface; verifying the address information when the indication indicates that the address information should be verified; and not verifying the address information when the indication indicates that the address information should not be verified.

The method may further comprise using the at least one hardware processor to: after completion of an initial iteration of the address verification process, assign a unique user account number to the first user account; and initiate printing of the unique user account number on a physical card to be mailed to the first user account.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a centralized address management platform. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
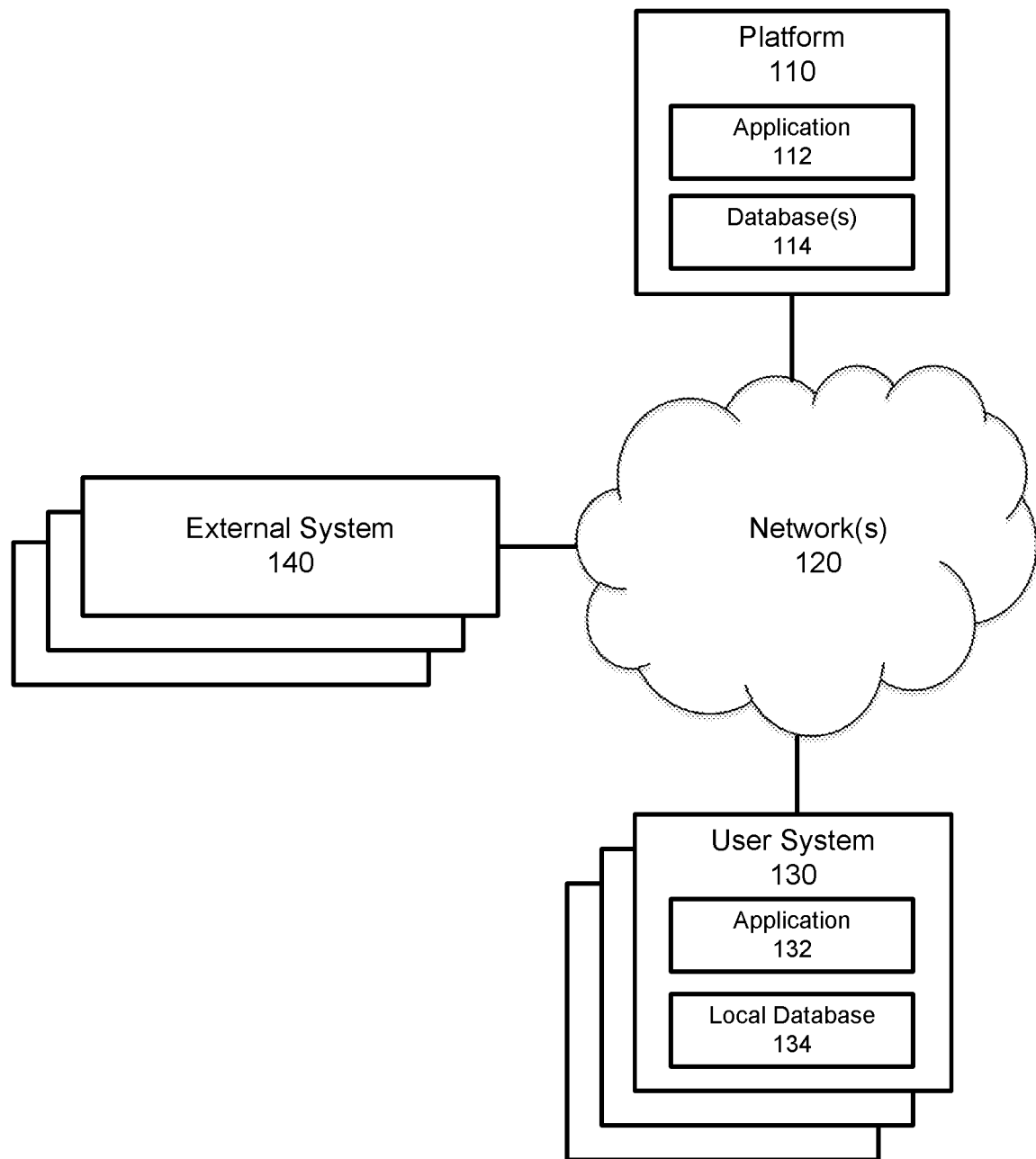
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 is an embodiment of the centralized address management platform discussed above. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

1.2. Example Processing Device

Figure 2:
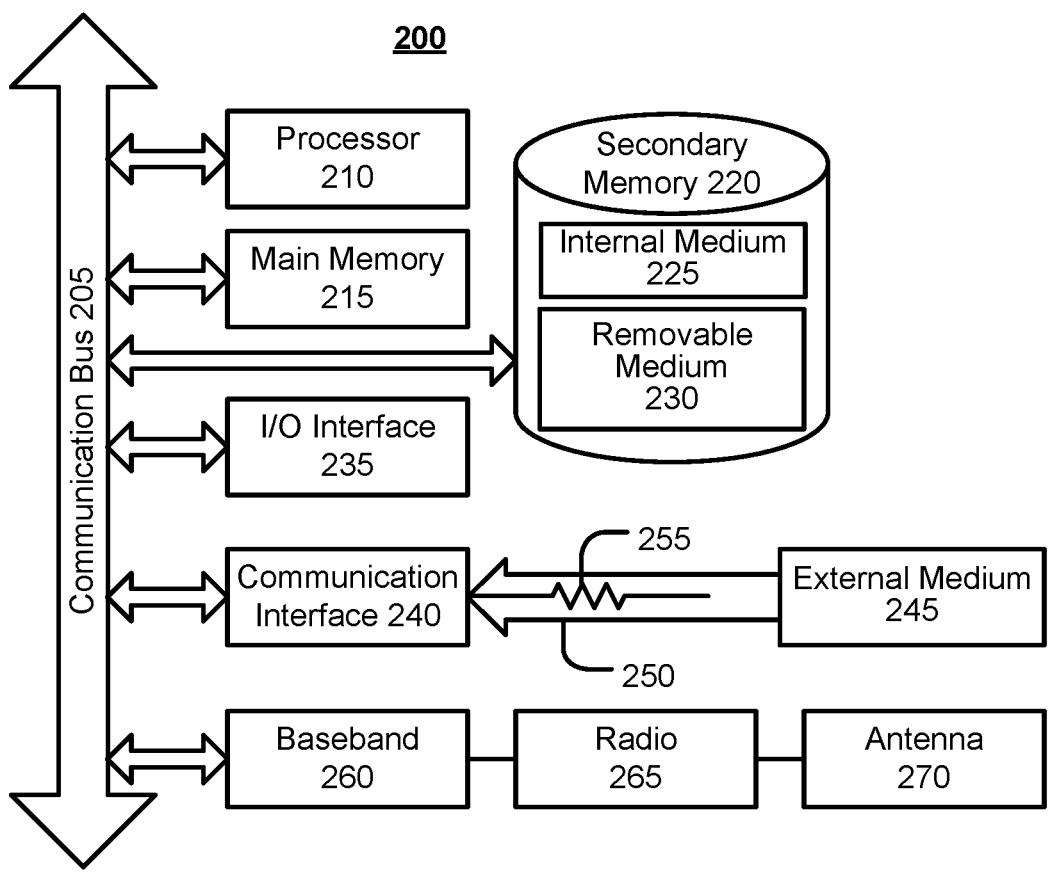
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules of the disclosed application) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as one or more software modules of the disclosed application) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for ensuring privacy in centralized address management will now be described in detail. It should be understood that the described processes may be embodied in one or more software modules that are executed by one or more hardware processors (e.g., processor 210), for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Account Registration and Authentication

In an embodiment, users may register with platform 110, to create a user account with the application, using any known means. The application may support users with at least three types of roles: (1) administrative; (2) recipients; and (3) sender. One user may have a single role or a plurality of roles. For example, one user may be both a recipient and a sender. While it is contemplated that recipients would be users with mailing addresses at which they wish to receive mail and senders would be organizational users with the need or desire to mail items to the recipients, the application may be used in any paradigm in which there are senders and recipients. For example, family members or friends may utilize the application to send and receive mail to and from each other (e.g., personal letters, holiday cards, postcards, etc.). It should be understood that users with an administrative role may be employees of the operator of platform 110 who are responsible for maintaining the application.

Users with non-administrative roles may create a user account by supplying information, such as a username, password, email address, telephone number, first and last name, birthdate, government-issued identifier (e.g., Social Security number, driver's license number, passport number, etc.), and/or any other information that is useful for the various functions implemented by platform 110. In an embodiment, the user's email address may be used as the user's username. It should be understood that the information may be received via one or more inputs of a graphical user interface generated by the application. In addition, a user may be required to supply different information, depending on their role. For example, an organization with a sender role may be required to provide the name of the organization, an industry category (e.g., bank, government, e-commerce, background verification service, etc.), and/or the like.

Once a user has submitted all necessary information, a user account with the application may be created for the user. However, in an embodiment, verification of one or more of the supplied information items may be required before the user can log into the account or use certain features of the account. For example, the application may send an email message to the email address supplied by the user during registration, a Short Message Service (SMS) or Multimedia Messaging Service (MMS) text message to the telephone number supplied by the user during registration, a voice call to the telephone number supplied by the user during registration, and/or the like. In the case of a message, the message may comprise a link to a Uniform Resource Locator (URL) for the user to click on and/or a code for the user to input into a particular screen of the graphical user interface. Visitation to the URL (e.g., by clicking on the link or entering the link into a browser) and/or the input of the correct code results in verification of the user account. In this manner, the application verifies that the user has access to the email address and/or telephone number that was provided during registration. After verification, the user may have access to the user account that was created after the registration process and/or additional features of the user account.

In an embodiment, the application may enable organizations to create a plurality of users under the same overarching organizational account. In other words, a plurality of user accounts may be linked to the same organization, and inherit information (e.g., organization-specific information) from the overarching organizational account. In this case, one or more of these users may have an administrative role within the organizational account, with the ability to add and/or delete users linked to the organization account, edit information in the organizational account, and/or the like. Each user account within an organizational account may have access to the various functionality described herein.

In an embodiment, two-factor authentication may be required for the user to log in to the user account. For example, in a first step, the user may be required to input the correct pairing of username and password into a login screen of the graphical user interface. If the input username is associated with a valid user account and the input password is associated with the username and/or user account, a code may be sent in a message to the user. For instance, the code may be sent in an email message to the email address associated with the user account or in a text message to the telephone number associated with the user account. In addition, the user may be redirected to a screen of the graphical user interface that prompts the user to input the code. If the input code matches the sent code, the user is authenticated and logged into the user account. Otherwise, the user is prevented from logging into the user account. This two-factor authentication may be performed each time a user attempts to log in, only the first time that the user attempts to log in from a particular device, after a certain period of time has passed (e.g., twenty-four hours, one week, one month, etc.) since the user's most recent login, and/or the like. It should be understood that, when two-factor authentication is not required, one-factor authentication may be sufficient (e.g., valid username and password).

2.2. Address Registration

Figure 3:
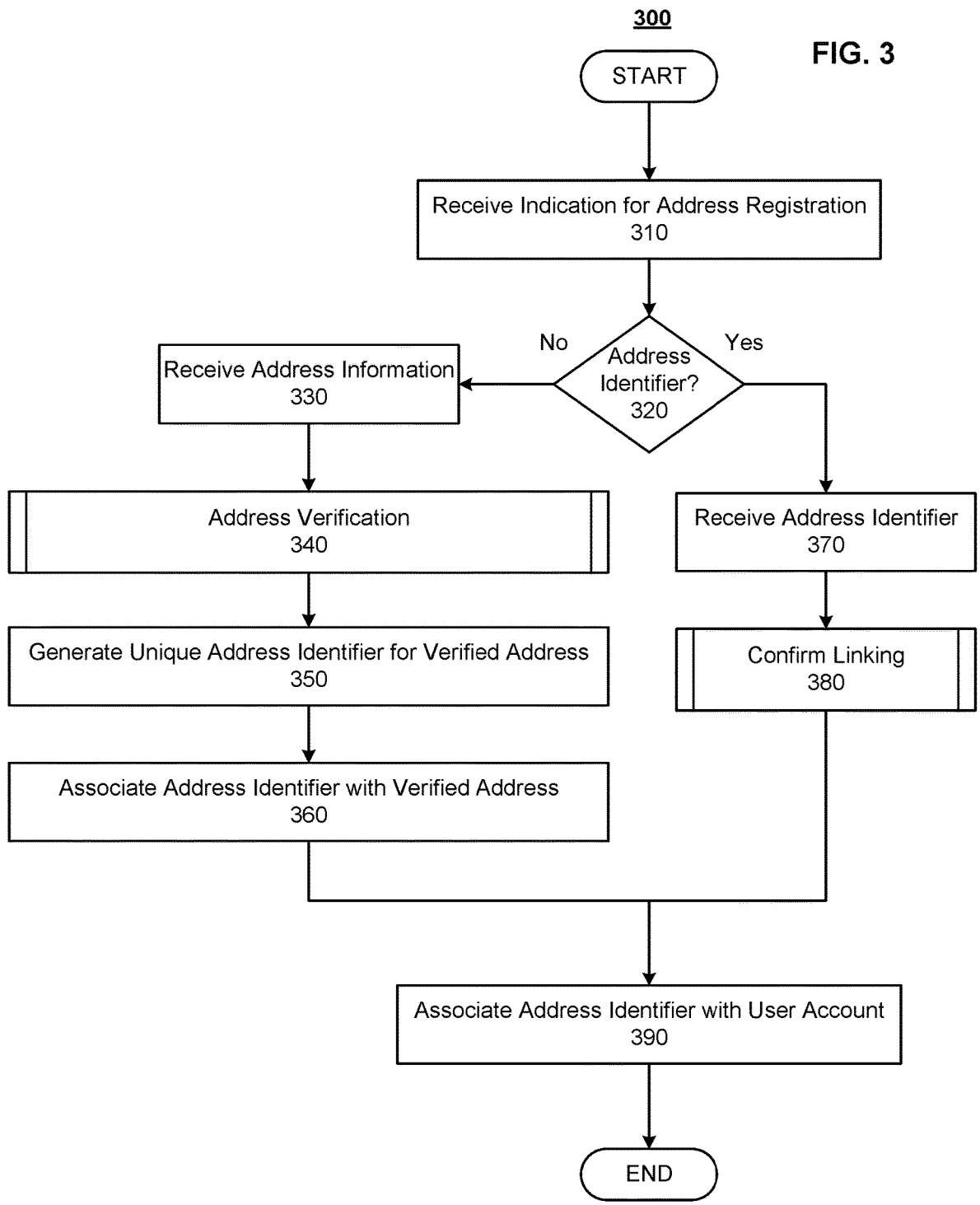
FIG. 3 illustrates an address registration process, according to an embodiment.

FIG. 3 illustrates an example of an address registration process 300, according to an embodiment. It should be understood that process 300 may be implemented by the disclosed application. Address registration process 300 may be executed each time that a user attempts to add a new address to his or her user account. The application may provide access to address registration process 300 only after a user has logged into his or her user account (i.e., been authenticated with the application), and optionally, only after the user account has been verified, as described elsewhere herein. Thus, only authenticated users may register addresses under their user accounts.

Initially, in subprocess 310, an indication is received that the user desires to register a new address to his or her user account. The indication may be the selection of an input of the graphical user interface generated by the application. For example, the graphical user interface may comprise an input (e.g., call-to-action button, icon, etc.), in a dashboard or menu, for registering a new address. When the input is selected, the user may be prompted to specify the new address according to one or more input paths. In an embodiment, the application provides at least two input paths for specifying the new address as either a unique address identifier or as address information. The graphical user interface may comprise an input for selecting the desired input path (e.g., via different screens) or may provide inputs for both input paths in the same screen.

If the user chooses to specify the new address as address information (i.e., "No" in subprocess 320), address information is received in subprocess 330. For example, the user may input the address information into one or more inputs (e.g., textboxes, drop-down menus, etc.) of the graphical user interface. The address information may comprise the standard components of a mailing address. In the United States, these standard components comprise, without limitation, a street address (e.g., comprising one or more address lines, with street number, street name, suite or apartment number, etc.), a city name, a state name (e.g., as a drop-down menu), and a Zip code. It should be understood that the graphical user interface may be easily adapted to receive the address information according to the formats of mailing addresses in other countries and jurisdictions.

Once the address information has been received, subprocess 340 is initiated to verify the address. Subprocess 340 may verify an address using one or a plurality of methods. In an embodiment which provides a plurality of methods for verifying an address, the user may select one of the plurality of methods to complete, and may only be required to complete the selected method to verify the address for which address information was received in subprocess 330. Alternatively, the user may be required to select and complete two or more of the plurality of methods, or may be required to complete all of the plurality of methods, before the address is verified. Regardless of whether subprocess 340 provides one or a plurality of methods for verifying the address, the available or required method(s) may comprise one or more of the following:

Document Verification Method: In this method, the user is required to upload an image of a document that includes both the user's name and the address information received in subprocess 330. Alternatively or optionally, the user may mail the document or a copy of the document to an address associated with an operator of the application, and the document may be reviewed or scanned into an image file by the operator. In either case, the document may be required to be an agreement or other record that evidences the user's right to receive mail at the address. Examples of such documents include lease agreements, property tax bills, mortgage statements, property deeds, and/or the like. In an embodiment in which an image of the document is used, the name and address information may be automatically extracted from the image of the document using optical character recognition (OCR) and/or a machine-learning model, and automatically compared to the user's name, provided during account registration, and the address information received in subprocess 330. Alternatively, the extraction and comparison may be performed manually by the operator of the application. If the names and address information match, the user has completed this verification method. Otherwise, if the name or address information do not match, the user has not completed this verification method.

Postcard Verification Method: In this method, a postcard is mailed to the address represented by the address information received in subprocess 330. The postcard may be printed with a code, as well as an informational notice describing the purpose of the postcard and/or how to use the code. The code may be a character string (e.g., comprising letters, numbers, and/or a combination of numbers and letters) that is automatically and/or randomly generated by the application and stored by the application (e.g., in database 114). To complete this verification method, the user may be required to login to his or her user account and input the code into an appropriate input (e.g., textbox) in the graphical user interface. The application may compare the input code to the stored code that was printed on the postcard. If the input code matches the stored code, the user has completed this verification method. Otherwise, if the input code does not match the stored code, the user has not completed this verification method.

Manual Verification Method: In this method, an agent of the operator of the application travels to the address represented by the address information received in subprocess 330 to manually verify that the user is an occupant at the address. The application may comprise a scheduling tool that enables the user and agent to agree on a day and time for the agent's visit. The agent may visit the user, verify the user is an occupant at the address, and confirm or deny the user's occupancy at the address based on the visit. As alternatives to an agent's visit, the agent may schedule a video call with the user to verify the user's occupancy, the user may visit the agent (e.g., at a regional center of the operator) to provide documentation or other evidence of the user's occupancy to the agent, or upload documentation or other evidence of the user's occupancy to the application for review by the agent. If the agent is convinced of the user's occupancy, the agent will confirm the user's occupancy at the address. Otherwise, if the agent is not convinced of the user's occupancy (e.g., the user refused to attend a visitation, did not provide the appropriate documentation or other evidence, etc.), the agent will deny the user's occupancy at the address. To confirm or deny the user's occupancy at the address, the agent may login to the application with an administrative role and utilize one or more inputs of the graphical user interface to confirm or deny the user's occupancy. If the agent confirms the user's occupancy, the user has completed this verification method. Otherwise, if the agent denies or fails to confirm the user's occupancy, the user has not completed this verification method.

As discussed above, the user may be required to complete two or more separate verification processes. In this case, a status of the address in the user account may be updated to reflect the current status of the overall verification process. For example, in an embodiment, the status of the address may be initially set to "pending" when the address information is first received in subprocess 330, and the user may be prompted or guided to complete the document verification method (e.g., by uploading a document which is automatically and/or manually reviewed). Once the user completes the document verification method, the status of the address may be set to "current." Then, the application may automatically generate a code and initiate the printing of the code on a postcard. The postcard may be mailed to the address for completion of the postcard verification method. Once the user receives the postcard and inputs the code into the graphical user interface for his or her authenticated user account, the user has completed the postcard verification method, and the status of the address may be set to "verified," to indicate the address is now verified. Alternatively, once the postcard verification method has been completed, the user may be required to complete the manual verification method before the status of the address is set to "verified."

Any errors that occur during subprocess 340 may be appropriately addressed by customer service representatives for the operator and/or by a bot. For example, the user may be notified of any error that occurs during any of the verification methods, either via the graphical user interface and/or other communication means (e.g., email message, text message, telephone call, etc.). In some cases, the error notification may be immediate. For instance, if the user inputs the wrong code, the graphical user interface may immediately notify the user that the input code does not match the stored code. If a user believes that an error is inappropriate or otherwise needs help troubleshooting the verification process, the user may contact a customer service representative for assistance. The customer service representative may interact with the user via the graphical user interface and/or other communication means.

Once the address representing the address information received in subprocess 330 is verified in subprocess 340 (e.g., the status has been set to "verified"), the application generates an address identifier in subprocess 350 to uniquely identify the verified address from all other verified addresses. The address identifier may be a character string (e.g., comprising letters, numbers, or a combination of letters and numbers) that is automatically and randomly generated by the application and checked to ensure that it is not identical or similar to any existing address identifier. In an embodiment, the address identifier is human readable and sufficiently long to prevent random guessing of address identifiers, but sufficiently short to be manually input within a reasonable amount of time (e.g., several seconds or less). For example, the address identifier may be eight to sixteen characters in length. Importantly, in an embodiment, the address identifier does not comprise or encode any information about the address which it identifies. In other words, the address information cannot be derived from the address identifier alone (e.g., without indexing into a database that associates the address identifier with the address information).

In an embodiment, the application may enable the user to adjust or change the address identifier. For example, the application may present the address identifier, generated in subprocess 350, in the graphical user interface with a prompt and an input (e.g., textbox pre-populated with the generated address identifier) for editing the generated address identifier, or deleting the generated address identifier and inputting an entirely new address identifier. The user may then select an input for requesting the new address identifier. The application may process the new address identifier to ensure that it does not conflict with any existing address identifiers and/or ensure that it complies with general requirements of address identifiers (e.g., sufficient length, consists of allowable characters, sufficiently difficult to guess, does not comprise or encode any information from the address information, etc.). If the requested address identifier is not already associated with an address and complies with the general requirements, the application may approve the requested address identifier. Otherwise, the application may deny the requested address identifier, notify the user that the requested address identifier was denied (e.g., along with a reason for the denial), and prompt the user to either accept the application-generated address identifier or request a different address identifier.

In subprocess 360, the address identifier, which was generated and/or approved in subprocess 350, is associated with the verified address, so as to uniquely identify the verified address within the application. The address identifier represents a shorthand for the user's current address. Once generated and associated with the user's address, the address identifier may be provided to the user. For example, the address identifier may be displayed within the graphical user interface for the user's user account. The address identifier may be displayed in its raw form (e.g., as a character string) and/or encoded in a linear barcode or a two-dimensional matrix barcode (e.g., a Quick Response (QR) code) that is capable of being read by a barcode reader. It should be understood that a barcode reader may comprise a dedicated optical or laser barcode reader, or may comprise a barcode-reading application in a mobile device (e.g., smartphone) with a camera capable of capturing an image of a barcode. In any case, the barcode reader can process an image or other sensing of the barcode to decode the barcode into a character string (e.g., comprising the address identifier, a URL, etc.). Regardless of the form of the address identifier, the user is empowered to easily share the address identifier with other users of the application.

If the user chooses to specify the new address as an address identifier (i.e., "Yes" in subprocess 320), an address identifier is received in subprocess 370. For example, the user may input an existing address identifier into an input (e.g., textbox) of the graphical user interface. Alternatively or as an additional option in an embodiment in which the address identifier is encoded into a barcode (e.g., QR code), the user may input the existing address identifier by scanning the barcode using a barcode reader (e.g., camera and app on the user's smartphone). In this case, the barcode reader may decode the barcode into a character string, which the application then receives as the address identifier. In an embodiment, the character string may be a URL for a webpage of the application that, when visited, automatically performs subprocess 370 (e.g., after authentication). In either case, the application may confirm that the address identifier, received in subprocess 370, is valid. An address identifier is valid if it already exists and is associated with a verified address (e.g., in database 114). If the address identifier is invalid, the user may be notified of the error and prompted to input a valid address identifier.

Once a valid address identifier is received in subprocess 370, the application may confirm whether or not to link the user to the address identifier. Specifically, the application may retrieve the user account that is currently associated with the address identifier, and send a request to the user associated with the retrieved user account. The request may be sent via a dashboard of the graphical user interface for the associated user account and/or other communication means (e.g., email message, text message, telephone call, etc.). The request may prompt the receiving user to either approve or deny the request to link the address identifier with the user account of the requesting user. For example, the prompt may comprise an input for approving the request and an input for denying the request. The prompt may also identify the requesting user (e.g., by first and last name) and provide the address information associated with the address identifier. If the receiving user denies the request, the requesting user may be notified of the declination. If the receiving user approves the request, the linking is confirmed and process 300 proceeds to subprocess 390.

In subprocess 390, the address identifier that was generated and associated with a verified address in subprocesses 350 and 360, respectively, or confirmed for linking in subprocess 380, is associated with the user account for which the indication was received in subprocess 310. It should be understood that, in the path formed by subprocesses 370 and 380, this user account, with which the address identifier is associated, is the user account of the requesting user. In this case, the address identifier will be associated with at least two different user accounts. In other words, a single address identifier can be shared by and linked to a plurality of user accounts.

It is contemplated that the first path, represented by subprocesses 330-360, will be used by the first user to register a particular address. That user may then share the address identifier, generated in subprocess 350, with other occupants at the same address associated with the address identifier. For example, these occupants may be members of the user's household. Having the shared address identifier, one or more of the other occupants at the address may then utilize the second path, represented by subprocesses 370 and 380, to link their own user accounts to the same address via the shared address identifier. Accordingly, it is easy for the other occupants to associate the address with their own respective user accounts.

Notably, in an embodiment, a user who registers an address via the address identifier does not have to go through the address verification of subprocess 340. In other words, the address only needs to be verified once by the first user to register the address. Thus, for example, other occupants at the address can easily register an already verified address using the address identifier shared with them by the first user to register the address, without themselves having to go through the verification process.

In an embodiment, the application enables a user to register and maintain a plurality of addresses. Each of these plurality of addresses may have a different address identifier. Thus, it is contemplated that a user could register a home address, a business address, a Post Office (PO) box, and/or the like, and each of these would be assigned a different unique address identifier. Accordingly, the user can share different address identifiers with different subsets of people, depending on those people's relationships to the user. For example, the user could share the address identifier of a home address with other members of the user's family and/or organizations that are related to the user's personal affairs, and could share the address identifier of a business address with coworkers or employees and/or organizations that are related to the user's employment. It should be understood that recipients of the address identifier of the user's home address would not generally know the address identifier of the user's business address, and recipients of the address identifier of the user's business address would not generally know the address identifier of the user's home address, unless the user chose to share both address identifiers. Thus, the user may keep his or her home and business affairs separate.

2.3. User Account Number

In an embodiment, a unique user account number may be assigned to a user account once it is associated with a verified address. For example, the user account may not be assigned a user account number until the first time that subprocess 390 is completed for the user account. At this moment, the user account may be assigned the unique user account number, which may then be provided to the user of the user account. For example, the user account number may be provided via the graphical user interface (e.g., dashboard, printable electronic document, such as a PDF, etc.) of the user account. Alternatively or additionally, the user account number may be provided via a physical card, similar in size and structure to a driver's license, credit card, business card, Social Security number (SSN) card, and the like. For example, once the user account number has been assigned to the user account, the application may add a printing job to a printing queue for printing the user account number, and optionally other information (e.g., user's name, associated address identifier(s), etc.), on a physical card to be mailed to the current address associated with the user account. The physical card may comprise a magnetic strip that can be scanned to acquire information including the user account number, a microchip that can be interrogated via direct or near-field communication to acquire information including the user account number, and/or the like. The physical card may be useful for one or more benefits provided by the operator of platform 110 and/or a third party (e.g., organizations, including companies, government agencies, etc.). For instance, the physical card may be used to verify that the card holder lives in the country, scanned to verify the validity of the user account, and/or the like.

2.4. Address Change

Notably, the address identifier may remain static even as the address with which it is associated (e.g., in subprocess 360) changes. Thus, a user may utilize the same address identifier over the lifetime of his or her user account. Advantageously, this prevents the user from having to update his or her address with other users (e.g., other users who send mail to the user) each time the user changes his or her address. In other words, the user simply has to provide a single address identifier at the beginning of each sender-recipient relationship and be secure knowing that he or she will never miss any mail regardless of how many times he or she changes addresses.

Figure 4:
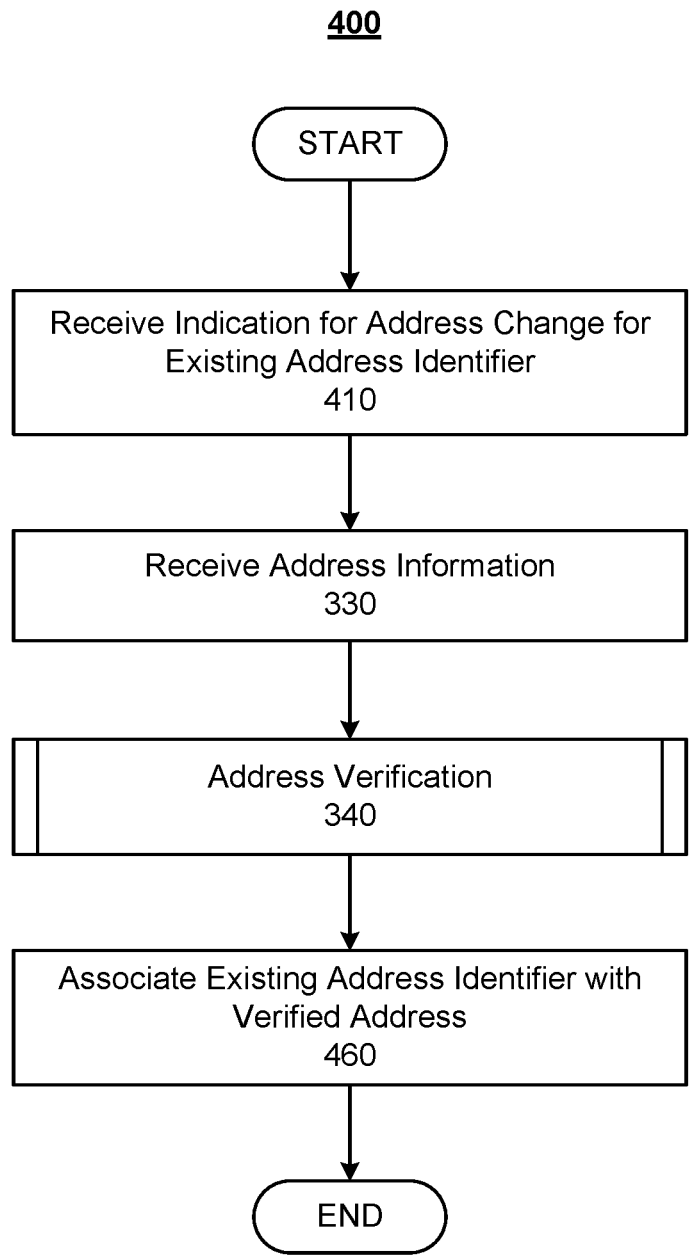
FIG. 4 illustrates an address change process, according to an embodiment.

FIG. 4 illustrates an example of an address change process 400, according to an embodiment. It should be understood that process 400 may be implemented by the disclosed application. Address change process 400 may be executed each time that a user attempts to change an existing address that is associated with his or her user account. The application may provide access to address change process 400 only after a user has logged into his or her user account (i.e., been authenticated with the application), and only if there is an existing address associated with the user account.

Initially, in subprocess 410, an indication is received that the user desires to change an existing address associated with his or her user account. This indication may be the selection of an input of the graphical user interface that is associated with the existing address. For example, the graphical user interface may comprise an input (e.g., an edit icon near a visual representation of the existing address, or other call-to-action button, icon, etc.), in a dashboard or menu, for changing an existing address. In embodiments which allow a user to have a plurality of addresses associated with his or her user account, the user may select one of the plurality of addresses to change (e.g., from a selectable list of addresses that are associated with the user account).

In subprocess 330, the new address information is received. Subprocess 330 in process 400 may be identical or similar to subprocess 330 in process 300, and therefore, will not be redundantly described. However, it should be understood that, in an alternative embodiment, subprocess 330 in process 400 may be different than subprocess 330 in process 300.

In subprocess 340, the address represented by the new address information, received in subprocess 330, is verified. Subprocess 340 in process 400 may be identical or similar to subprocess 340 in process 300, and therefore, will not be redundantly described. However, it should be understood that, in an alternative embodiment, subprocess 340 in process 400 may be different than subprocess 340 in process 300. For example, subprocess 340 in process 400 may comprise a different verification method or combination of verification methods than subprocess 340 in process 300.

Once the address representing the address information received in subprocess 330 is verified in subprocess 340 (e.g., the status has been set to "verified"), the application associates the existing address identifier, for which an indication was received in subprocess 410, with the new verified address in subprocess 460. In addition to, or as a consequence of, this association with the new verified address in subprocess 460, the existing address identifier may be disassociated with the address to which it was previously associated. For example, the existing address identifier may be unlinked from the old address, or the old address may be associated with a status indicating that it is a past or non-current address. In any case, the address identifier that was associated with the old address is newly associated with the new address, thereby remaining static across address changes.

In an embodiment, when entering the address information in subprocess 330 of process 400, the user may input a move-in date. For example, the graphical user interface may comprise one or more inputs for inputting a move-in date (e.g., comprising a month, day, and year). The move-in date represents a date on which the user plans to occupy the address represented by the address information. Thus, a user may change his or her address even before he or she has moved into the address. It should be understood that the move-in date may be a past or current date, representing that the user has already moved into the new address.

In the background, the application will not disassociate the existing address with the address identifier and will not associate the new address with the address identifier until the move-in date. Alternatively, the application may associate both the existing address and the new address with the address identifier, but set the existing address as active or current, and set the new address as inactive, future, or non-current. Then, on the specified move-in date, the application may disassociate the existing address from the address identifier (or set the existing address as inactive, past, or non-current), and associate the new address with the address identifier (or set the new address as active or current if already associated with the address identifier). Advantageously, the user does not have to remember to change his or her address on the move-in date, and, in an embodiment, can have the address verified in subprocess 340 in advance of the move-in date. It should be understood that if the move-in date is a past or current date, the application may perform these actions immediately. However, if subprocess 340 requires a prolonged verification method, the application may manage the existing address and new address, in association with the address identifier, using statuses representing which of the two address is active, inactive, pending, current, non-current, and/or the like, during the verification process.

2.5. Organizational Access

While not necessarily the case, it is contemplated that most senders would be public organizations (e.g., governmental entities for a nation, state, county, city, community, etc.) or private organizations (e.g., non-profit and for-profit companies). In other words, organizations, as opposed to individuals, would likely be the largest source of mail through the application.

In an embodiment, platform 110 may provide a web service with an API for accessing back-end functionality of the application. An organizational user may build their own platform (e.g., a front-end with a graphical user interface) that accesses the web service via the API. This enables the organization to connect platform 110 to an existing or custom in-house platform (e.g., external system 140) that is configured for the organization's specific needs (e.g., graphical user interfaces, interfaces with ancillary in-house systems, pre-processing and/or post-processing of data, etc.), but relies on platform 110 for the core functionality related to centralized address management.

In an embodiment, an organizational user may have a user account with the application. The organizational account may be configured with an organizational role that provides different features than other user accounts (e.g., those used by individuals who are entirely or primarily recipients). For example, in an embodiment, the organizational role enables the organizational user to register an app with the application. As used herein, the term "app" refers to another application or platform (e.g., an external system 140) that interfaces with the disclosed application (e.g., via an API) to utilize one or more functions of the disclosed application.

The graphical user interface for an authenticated user with an organizational account may comprise one or more inputs for registering a new app. For example, the graphical user interface may comprise inputs for inputting server information of the app platform (e.g., external system 140) that will be utilizing the functionality of platform 110 through the API (e.g., via remote procedure calls, Representational State Transfer (REST), etc.). This server information may comprise, without limitation, a name of the app or server, a region of the server, a country of the server, an Internet Protocol (IP) address of the server, and/or the like.

The graphical user interface may also comprise one or more inputs for setting up authentication information for the app platform, so that the app platform can be authenticated before platform 110 allows the app platform to access functionality of platform 110. For example, when an organization registers a new app, the application may generate a unique API key for the app, and provide the unique API key to the organizational user. The organizational user may then configure the app platform to utilize the API key to authenticate and interact with platform 110. In an embodiment, the API key is only provided to the organizational user once. In this case, the graphical user interface for the organizational account may comprise one or more inputs for generating a new API key, so that, if the organizational user loses the existing API key, the organizational user can reset and create a new API key to be used between their app platform and platform 110. Additionally or alternatively, platform 110 may support a process for creating a server-to-server digital certificate (e.g., mutual or two-way authentication between platforms). In this case, authentication only occurs over a connection when both platforms trust the other platform's digital certificate. The exchange of certificates may be carried out via the Transport Layer Security (TLS) protocol or other cryptographic protocol. Platform 110 may also support a virtual private network (VPN), so that organizational users may utilize VPN tunneling to interact with platform 110 via the authenticated app platform. Thus, there may be multiple levels of security used to ensure that only authorized apps are able to access the functionality of platform 110.

2.6. Accessing Addresses

It is contemplated that organizations (e.g., non-profit and for-profit companies) will desire to send mail to users of the application. For example, a tax board may want to send mail to taxpayers, a court may want to send notices to defendants, litigants, or jurors, a bank may want to send notices to customers, a retailer may want to send coupons to local residents, and/or the like. At the same time, out of concerns for privacy and to avoid the annoyance of junk mail, many people are reluctant to give out their mailing addresses to such organizations. Advantageously, the disclosed application addresses the desires and concerns of organizational senders of mail, as well as those of mail recipients. For example, the use of the unique address identifier enables a user to simply provide the organization with the address identifier, instead of his or her actual address. Thus, privacy is maintained. In addition, an organization may be required to request access to a recipient user prior to sending any mail to that recipient user. Thus, an opt-in scheme is provided.

Figure 5:
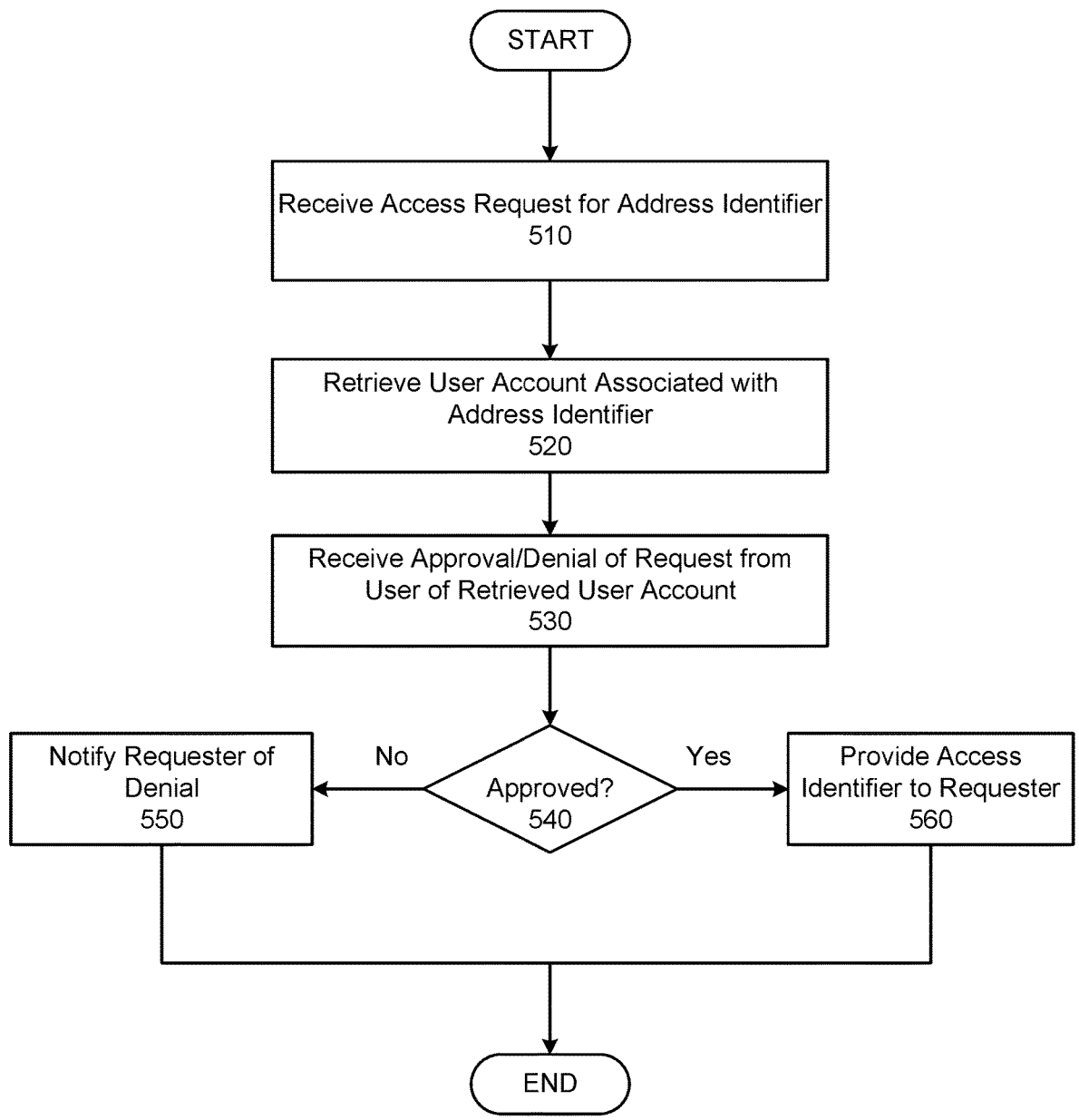
FIG. 5 illustrates an access request process, according to an embodiment.

FIG. 5 illustrates an example of an access request process 500, according to an embodiment. It should be understood that process 500 may be implemented by the disclosed application. Access request process 500 may be executed each time that a sender user (e.g., organizational user) attempts to request access to a recipient user. The application may provide access to access request process 500 only after a user has logged into his or her user account or, if via the API, after an app platform has been authenticated.

Initially, in subprocess 510, an access request is received from a sender user. The access request may comprise the address identifier that is associated with the address to which the sender user would like to send mail. The sender user may have received the address identifier directly from the user of the user account associated with that address identifier or indirectly through a service of platform 110 or an external platform. In other words, in an embodiment, the user of the user account must opt-in to receive mail from the sender by providing the sender with the user's unique address identifier. The user may provide his or her address identifier to the sender in any conventional manner (e.g., within a web form on the sender's website, in an email or text message to the sender, through an electronic kiosk in a shopping center or other location, by manually filling out a form at an organization's office, retail store, etc., by mailing a form to the sender, etc.). If the sender user is an organization, the access request may have been generated by an app of the organization and submitted to the application via the API. For example, the address identifier may be input by a user of the app (e.g., via a graphical user interface of the app) or retrieved by the app from a database of address identifiers, and the app may generate an access request, comprising the address identifier, in the appropriate format defined by the API. The app may then submit the access request, including the address identifier, and using any required authentication (e.g., an API key, server-to-server certificate, etc.) via the API.

In subprocess 520, the application parses the access request, received in subprocess 510, to extract the address identifier, and retrieves the user account that is associated with the extracted address identifier. It should be understood that data structures representing the user accounts may be stored in database 114 (e.g., as rows in a relational database table) and indexed by their associated address identifiers. Thus, the application can quickly search for and retrieve a user account based on any of its associated address identifiers.

In subprocess 530, the application receives an approval or denial of the access request from the user associated with the user account that was retrieved in subprocess 520. For example, the application may display a prompt in the graphical user interface for the retrieved user account (e.g., a dashboard) and/or may otherwise notify the access request to the user associated with the retrieved user account (e.g., email message, text message, telephone call, etc.). The prompt or notification may comprise an input for approving the access request and an input for denying the access request. If the user selects the input for approving the access request, the application receives an approval of the access request. Otherwise, if the user selects the input for denying the access request, the application receives a denial of the access request.

If the access request is denied (i.e., "No" in subprocess 540), the application notifies the requesting sender user of the denial in subprocess 550. For example, the denial may be displayed in a graphical user interface of the user account of the sender user, or, if the access request was submitted via an app, the denial may be returned to the app as a response to the access request (e.g., with the address identifier submitted in the access request, or with some other identifier linking the response to the access request).

If the access request is approved (i.e., "Yes" in subprocess 540), the application provides an access token to the requesting sender user in subprocess 560. In particular, the application may generate an access token. The access token may be a character string (e.g., letters, numbers, or a combination of letters and numbers) that is similar or identical in length and format to address identifiers (e.g., having the same general requirements as address identifiers). The application may then associate the access token with the address identifier from the access request, and notify the requesting sender user of the access token. For example, the access token may be displayed in a graphical user interface of the user account of the sender user, or, if the access request was submitted via an app, the access token may be returned to the app as a response to the access request (e.g., with the address identifier submitted in the access request, or with some other identifier linking the response to the access request).

In an embodiment, the access token may be provided to the requesting sender user prior to approval of the access request. However, in this case, the access token may be associated with a status of "pending." Once the access request is approved by the user associated with the user account that was retrieved in subprocess 520, the access token may be associated with a status of "approved." Conversely, if the access request is denied by this user, the access token may be associated with a status of "denied." The application may ensure that the requesting sender user can only utilize an access token that is associated with a status of "approved," by denying any subsequent requests that utilize an access token that is associated with any other status (e.g., "pending" or "denied"). In other words, a sender user can only consume or send to an address after the sender user's access request has been approved by the recipient user.

In the event that the access request is approved, the requesting sender user will be provided with an approved access token in subprocess 560. Each access token is associated with an address identifier that represents an address associated with a user account. Thus, the access token can be used by the sender user to either consume the address currently associated with the address identifier that is associated with the access token and/or send mail to the address currently associated with the address identifier that is associated with the access token.

In an embodiment, an access request could indicate whether the request is to consume the address or to send mail to the address, and the recipient user receiving the access request can approve or deny the access request based on the indication. Alternatively, when prompting the recipient user, the graphical user interface may comprise a first input for approving consumption of the address and a second input for approving sending mail to the address. It should be understood that, if the application provides other usages of an address, additional inputs may be provided for each of those other usages. Thus, the recipient user may approve one or more, including potentially all, of the available usages. It should be understood that, if the user approves a first usage (e.g., sending mail), but not a second usage (e.g., consumption of the address), the sender user would be permitted to send mail, but prohibited from consuming the address. To this end, the access token may be associated (e.g., in database 114) with only those usage(s) selected by the recipient user, and the requesting sender user will only be permitted to utilize the access token for those associated usages, while being prohibited from utilizing the access token for any unassociated (i.e., unselected) usages.

Advantageously, the use of access tokens enables a recipient user to easily opt-out of any future access by an organization or other sender. For instance, the graphical user interface of each user account may comprise a list of senders for which the user has approved access or navigation to such a list. The graphical user interface may also comprise one or more inputs for revoking access by each sender in the list of senders. If the user revokes access by a sender, the access token that was granted to that sender may be invalidated by deleting the access token and/or its association to the address identifier or by associating the access token with a status indicating that it has been revoked. Consequently, if the sender attempts to utilize the revoked access token in the future to consume the user's current address or send digital mail to the user's current address, the application will prevent the sender from doing so. In addition, the application may notify the sender that the access token is invalid and/or has been revoked.

Notably, an access token is associated with a static address identifier that is always associated with the associated user's current address, even as it changes. Thus, even as a recipient user's address changes over time, a valid, unrevoked access token will always provide access to the user's current address. Advantageously, the user never has to update his or her address with senders. In other words, the user only ever has to change his or her address with the application, and not with each individual sender user. In this manner, the application provides the user with centralized address management, so that, if the user's address changes, he or she only needs to update the application once with the new address, and this single update is sufficient to effect the address change for every sender user.

2.7. Consuming an Address

In an embodiment, a sender user may consume a recipient user's address using a valid approved access token. As used herein, the term "consume" means that the actual address information (e.g., street address, city, state, Zip code), as opposed to only the address identifier, is provided to the sender user. Notably, because the recipient user has the ability to either approve or deny an access request, the recipient user can control who is able to access the address information.

Figure 6:
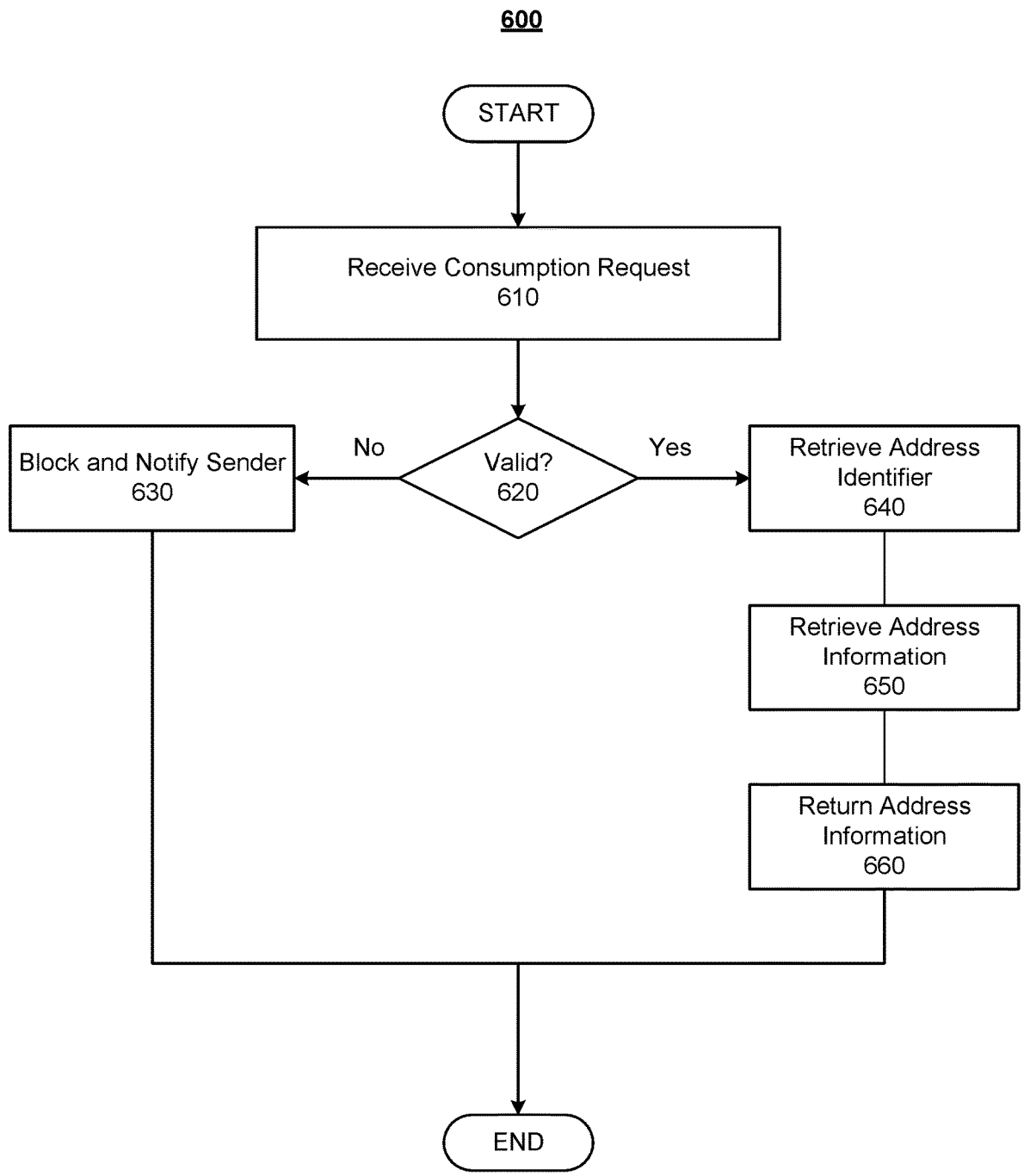
FIG. 6 illustrates an address consumption process, according to an embodiment.

FIG. 6 illustrates an address consumption process 600, according to an embodiment. It should be understood that process 600 may be implemented by the disclosed application. Address consumption process 600 may be executed each time that a user (e.g., organizational user) attempts to consume another user's address. The application may provide access to address consumption process 600 only after a user has logged into his or her user account or, if via the API, after an app platform has been authenticated.

Initially, in subprocess 610, the application may receive a consumption request. The consumption request may have been sent by a sender user (e.g., within the graphical user interface of the application) or an app (e.g., via the API). The consumption request may comprise the access token and, in an embodiment which requires it, authentication information (e.g., the API key for the app being used to submit the consumption request).

In subprocess 620, the application determines whether or not the access token in the consumption request, received in subprocess 610, is valid. For example, the application may attempt to retrieve the access token (e.g., from database 114). If the access token cannot be retrieved (e.g., because it does not exist) or if the access token that is retrieved has not been approved (e.g., is associated with a "pending" or "denied" status in an embodiment which utilizes statuses for the access tokens), the application determines that the access token is invalid (i.e., "No" in subprocess 620). On the other hand, if the access token is retrieved and has been approved (e.g., exists and is associated with an "approved" status in an embodiment which utilizes statuses for the access tokens), the application determines that the access token is valid (i.e., "Yes" in subprocess 620).

In subprocess 630, if the application has determined that the access token is invalid (i.e., "No" in subprocess 620), the application will block the consumption request. In addition, the application may return a notification to the sender user from which the consumption request was received. The notification may notify the sender user that the request was denied and/or why the request was denied (e.g., invalid access token).

In subprocess 640, if the application has determined that the access token is valid (i.e., "Yes" in subprocess 620), the application may retrieve the address identifier that is associated (e.g., in database 114) with the access token. Then, in subprocess 650, the application may retrieve the address information associated with the address identifier that was retrieved in subprocess 640. In subprocess 660, the address information that was retrieved in subprocess 650, may be returned to the sender user (e.g., within the graphical user interface of the application or via the API) from which the consumption request was received in subprocess 610. The address information may be returned in a format defined by the application or specified by the consumption request. Different formats may be used for different countries or jurisdictions.

2.8. Sending Mail

In an embodiment, a sender user, with a valid access token (i.e., approved by the recipient user), may send digital mail to the address corresponding to that access token. Notably, if the sender user does not have an access token or has an invalid (e.g., unapproved or revoked) access token, the sender user is prohibited from sending digital mail to an address. Thus, because the recipient user has the ability to either approve or deny an access request, the recipient user can control who is able to send mail to the recipient user.

Figure 7:
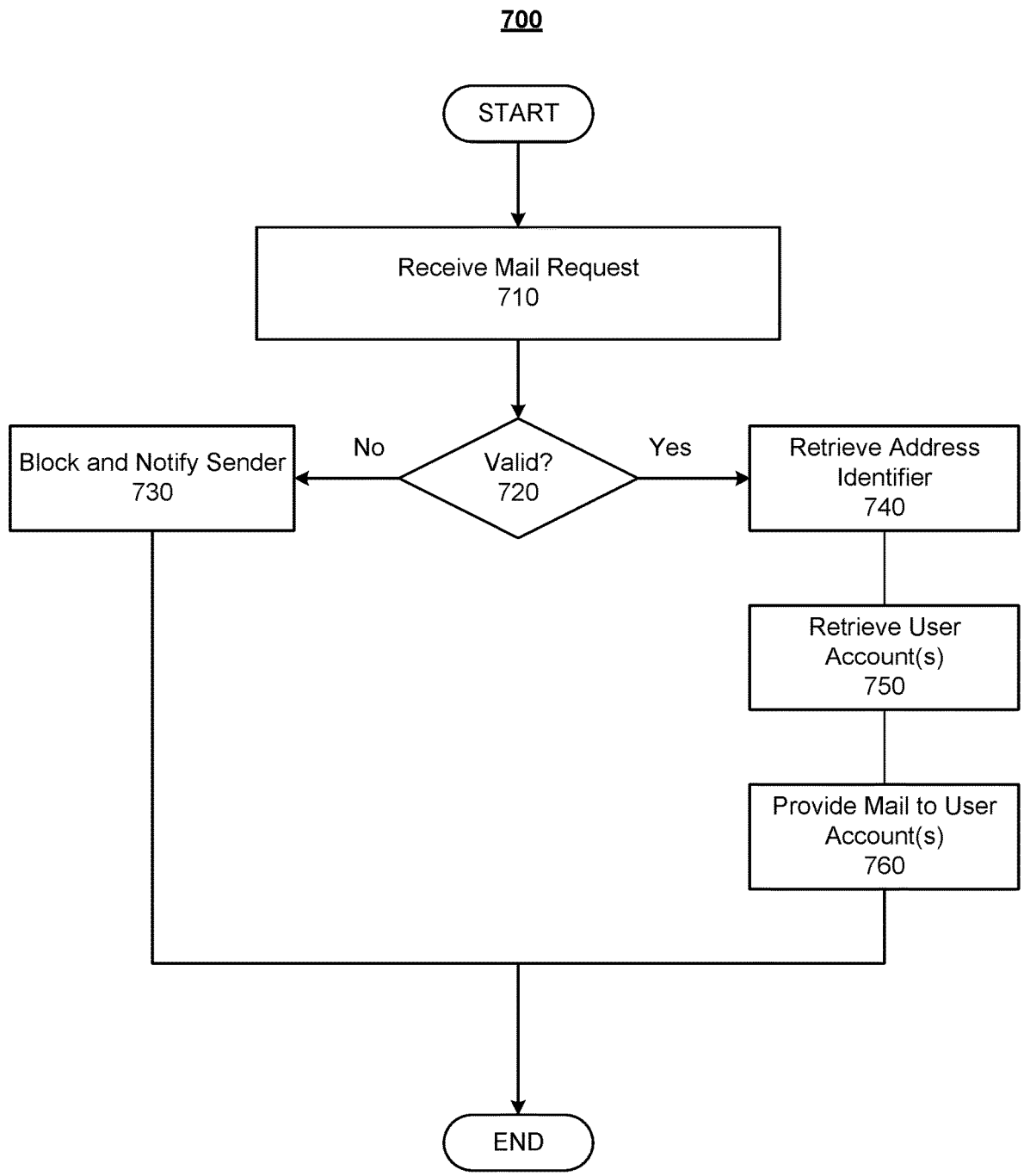
FIG. 7 illustrates a mailing process, according to an embodiment.

FIG. 7 illustrates a mailing process 700, according to an embodiment. It should be understood that process 700 may be implemented by the disclosed application. Mailing process 700 may be executed each time that a user (e.g., organizational user) attempts to send mail to another user. The application may provide access to mailing process 700 only after a user has logged into his or her user account or, if via the API, after an app platform has been authenticated.

Initially, in subprocess 710, the application may receive a mail request. The mail request may have been sent by a sender user (e.g., within the graphical user interface of the application) or an app (e.g., via the API). The mail request may comprise the access token and one or more items of digital mail (e.g., an electronic document, such as a document represented in Portable Document Format (PDF), HTML, XML, JSON, etc.), and, in an embodiment which requires it, authentication information (e.g., the API key for the app being used to submit the mail request). The mail request may also comprise a priority of the digital mail (e.g., urgent, high, medium, low, action required, etc.), a file type of the digital mail (e.g., PDF, HTML, XML, JSON, etc.), the name of an addressee, a title of the digital mail, a description of the digital mail, relevant tags (e.g., comma-separated list of keywords that are relevant to the digital mail), and/or the like.

In an embodiment, a sender of digital mail, when generating and sending the digital mail, may specify one or more actions that can be taken with respect to the digital mail. For instance, the graphical user interface may comprise one or more inputs for uploading or creating a new item of digital mail and/or for associating the new item of digital mail with one or more possible actions to be taken by the recipient user. Such actions may include, without limitation, replying to the digital mail (e.g., by inputting text into one or more fields, selecting one of a plurality of predefined responses, acknowledging that the digital mail was understood, etc.), adding one or more electronic signatures to the digital mail, and/or the like. As an example, the digital mail may be a form, and the associated actions may be filling in the fields of the form, adding an electronic signature to the form, and returning the filled-in and signed form to the sender. It should be understood that different action(s) can be associated with different items of digital mail, and that some items of digital mail may be associated with no actions.

In subprocess 720, the application determines whether or not the access token in the mail request, received in subprocess 710, is valid. Subprocess 720 may be similar or identical to subprocess 620 in consumption process 600.

Accordingly, the description of subprocess 620 applies equally to subprocess 720. Therefore, subprocess 720 will not be redundantly described herein.

In subprocess 730, if the application has determined that the access token is invalid (i.e., "No" in subprocess 720), the application will block the mail request. In addition, the application may return a notification to the sender user from which the mail request was received. The notification may notify the sender user that the request was denied and/or why the request was denied (e.g., invalid access token).

In subprocess 740, if the application has determined that the access token is valid (i.e., "Yes" in subprocess 720), the application may retrieve the address identifier that is associated (e.g., in database 114) with the access token. Then, in subprocess 750, the application may retrieve one or more user accounts associated with the address identifier that was retrieved in subprocess 740. In subprocess 760, the application may deliver a copy of the digital mail to the user account(s) associated with the address identifier.

Specifically, the application may add a copy of the digital mail to a mailbox associated with each of the user account(s). When a user of one of those user account(s) logs in, he or she may see a representation of the mailbox associated with the user account, for example, in a dashboard of the graphical user interface of the application. The representation of the mailbox may comprise a list of all or a subset of digital mail. Any new digital mail that has arrived since the user last logged in and/or any unread digital mail may be visually distinguished (e.g., highlighted, bolded, etc.) from other digital mail. The mailbox may also comprise one or more inputs for managing and sorting digital mail into a hierarchically arranged folder system, as well as one or more inputs for sorting and/or filtering digital mail in the mailbox.

It should be understood that there may be one or a plurality of user accounts associated with a given address identifier, and therefore, retrieved in subprocess 750. In the case that there is a plurality of user accounts retrieved in subprocess 750, a copy of the digital mail may be delivered to all of the plurality of user accounts. Alternatively, if the digital mail is associated with an addressee (e.g., in the mail request), the application may only retrieve user accounts, in subprocess 750, that match the addressee, and only deliver a copy of the digital mail to those user accounts with a matching addressee. It should be understood that an addressee may match a user account, when the addressee matches the name associated with the user account. Matching may require an exact match or may utilize fuzzy matching to account for variations in the formatting and spelling of names.

2.9. Consuming Mail

In an embodiment, a user may log in to his or her user account to consume digital mail that has been sent to the address(es) associated with that user account (e.g., sent by an organization using an access token). For example, the graphical user interface for the user account may comprise a virtual mailbox (e.g., in a dashboard or via navigation). If the user account is associated with a plurality of addresses, the graphical user interface may comprise a separate and distinct mailbox for each associated address and/or may comprise a single mailbox comprising the digital mail that has been received for all associated addresses.

Each mailbox may comprise a list of digital mail and inputs for the functionality that is typically available for email inboxes. For example, a mailbox may comprise inputs for reading specific items of digital mail, deleting specific items of digital mail, replying to specific items of digital mail, tagging specific items of digital mail with keywords, sorting mail in the mailbox (e.g., by date received, by sender, by subject, by whether or not the mail has been read, by user-specified and/or automatically determined tags, by the address to which the digital mail was sent, etc.), and/or the like. Each entry in the list of digital mail may represent a single item of digital mail, and may comprise the date the digital mail was received, a name of the sender of the digital mail, a subject and/or short description of the digital mail, an indication of whether or not the digital mail has been previously read, and/or the like.

Notably, all of the senders have had to be previously approved by the user (e.g., such that the sender has received an access token). Thus, the mailbox will not include digital mail from any unapproved organizations or other senders. Rather, any such mail would be blocked before reaching the user's mailbox due to the lack of a valid access token.

When the user selects an item of digital mail (e.g., from a mailbox comprising a list of selectable items of digital mail), the application may display the digital mail in the graphical user interface, along with standard inputs (e.g., for deleting the digital mail, closing the digital mail, replying to the digital mail, etc.). In an embodiment, a sender of digital mail, when generating and sending the digital mail, may specify one or more actions that can be taken with respect to the digital mail. If the digital mail is not associated with any actions, the user may simply read it, delete it, archive it, and/or the like. On the other hand, if one or more actions have been specified, the graphical user interface may provide one or more inputs for each of the one or more actions (e.g., in the same screen in which the digital mail is displayed), so that the user may fulfill the action(s).

For example, an action may be inputting a reply or filling in one or more fields. In this case, the input(s) may comprise a form with one or more textboxes into which the user can input the reply or each of the fields. The input(s) may also comprise a button or icon for submitting the form. As another example, an action may comprise digitally signing the digital mail or a form within the digital mail. In this case, the input(s) may comprise an input for providing an electronic signature, such as a textbox for inputting the user's name, a drawing frame for handwriting a signature using a pointing device or touch panel, a file input for uploading an image of the user's signature or uploading a signed version of the digital mail, and/or the like. As yet another example, an action may comprise selecting one or more options from a menu of options (e.g., a drop-down menu, a list of labeled radio buttons or checkboxes, etc.).

Once the user completes the action(s) associated with an item of digital mail, the application may notify the sender of the digital mail that the action(s) were completed. If the action(s) involved the recipient inputting data (e.g., a reply, filling in fields, providing an electronic signature, providing the original digital mail with all fields and/or signatures completed, selecting options, etc.), the data may be sent to the sender of the digital mail. For example, the data may be displayed in a dashboard (e.g., in a mailbox) of the sender's user account. Alternatively, if the digital mail was sent using an app via the API, the data may be returned to the app via the API of the application or an API of the app.

In the event that the data is pushed back to the app via an API of the app, the application may retrieve endpoint information associated with the digital mail and corresponding to the app through which the digital mail was sent. This endpoint information, which may comprise the URL or other information for submitting the data, may be received with the digital mail or collected when the digital mail is received by the application. The application may utilize the endpoint information to return the data via the API of the external app.

Specifically, the application may attempt to send the data to the API of the external app, and wait for a response. If the application receives no response after a timeout period or the application receives a response that indicates a delivery failure or other error, the application may attempt to resend the data to the API of the external app. If a response indicating success is not received after a predefined number of attempts, the application may give up and report the failure to the user who provided the data, the operator of platform 110, the operator of the app, the sender, and/or the like. The application may also record any failures or other errors in a log which can be reviewed by the operator of platform 110, the operator of the app, and/or the sender.

One problem in the mail industry is that organizations do not know if a user received or read their digital mail. Thus, in an embodiment, when the user selects an item of digital mail to read, the application may begin recording the user's dwell time as soon as the selected digital mail is displayed in the graphical user interface. The dwell time is a time period starting from when the digital mail is displayed and ending when there is an indication that the digital mail is no longer being viewed. This indication may comprise the user closing or deleting the digital mail item, completing and submitting all actions associated with the digital mail item, logging out of the user account, the expiration of the user's session or a predefined time period, and/or the like. Thus, the dwell time represents how long the user spent viewing the digital mail. This dwell time can be stored in association with the digital mail and/or notified to the sender of the digital mail (e.g., along with the data generated by the recipient user's completion of any associated actions). Thus, a sender can view a report (e.g., in the graphical user interface) of the dwell time of a particular user for a particular item of digital mail, an average dwell time across all users for a particular item of digital mail, an average dwell time for a particular user across all digital mail sent by the sender over a particular time period, an average dwell time across all users and all digital mail sent by the sender over a particular time period, and/or the like.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive an indication for an address registration by a user of a first user account;
   in response to receiving the indication, initiate an address registration process to associate the first user account with a unique address identifier by providing one or more inputs for inputting address information or inputting an old address identifier;
   when the address information is input for the address registration process,
      initiate an address verification process,
      generate a new address identifier as the unique address identifier,
      associate the new address identifier with the address information, and
      associate the new address identifier with the first user account;
   when the old address identifier is input for the address registration process,
      initiate a linking confirmation process to obtain an approval or a denial from a second user account that is already associated with the old address identifier, and,
      when the approval is obtained from the linking confirmation process, associate the old address identifier, as the unique address identifier, with the first user account in addition to the second user account;
   receive an access request, comprising the unique address identifier, from a third user account, via an application programming interface (API);
   initiate an access request process to obtain an approval or a denial of the access request from one or both of the first and second user accounts associated with the unique address identifier, wherein the access request process comprises
      retrieving the one or both of the first and second user accounts associated with the unique address identifier in the access request,
      requesting the approval or the denial of the access request from a user of the one or both of the first and second user accounts, and
      receiving the approval or the denial of the access request from the user of the one or both of the first and second user accounts;
   generate an access token;
   associate the access token with the unique address identifier in the access request;
   when the approval of the access request is obtained, send the access token to the third user account via the API;
   after receiving the approval of the access request and sending the access token to the third user account, receive an indication to revoke the access token from the user of the one or both of the first and second user accounts; and,
   in response to receiving the indication to revoke the access token, invalidate the access token such that future usage of the access token is prohibited.

2. The method of claim 1, wherein the linking confirmation process comprises:
   retrieving the second user account that is associated with the old address identifier;

requesting the approval or the denial from a user of the second user account; and receiving the approval or the denial from the user of the second user account.

3. The method of claim 1, further comprising using the at least one hardware processor to:
receive a change to the address information; and
associate the unique address identifier with the changed address information without changing the unique address identifier.

4. The method of claim 1, further comprising using the at least one hardware processor to:
receive a consumption request, comprising the access token, from the third user account;
when the access token is valid,
retrieve the unique address identifier associated with the access token,
retrieve the address information associated with the unique address identifier, and
send the address information to the third user account in response to the consumption request; and,
when the access token is invalid, notify the third user account that the consumption request was denied.

5. The method of claim 1, further comprising using the at least one hardware processor to:
receive a mail request, comprising the access token and one or more items of digital mail, from the third user account;
when the access token is valid,
retrieve the unique address identifier associated with the access token,
retrieve one or both of the first and second user accounts associated with the unique address identifier, and
deliver the one or more items of digital mail to the one or both of the first and second user accounts; and,
when the access token is invalid,
block delivery of the one or more items of digital mail, and
notify the third user account that the mail request was denied.

6. The method of claim 5, wherein the digital mail is associated with one or more actions, wherein delivering the one or more items comprises displaying the digital mail and one or more inputs for completing the associated one or more actions in a graphical user interface for the one or both of the first and second user accounts, and wherein the method further comprises using the at least one hardware processor to:
receive completion of the one or more actions, via the one or more inputs, from a user of the one or both of the first and second user accounts; and
send data derived from the completion of the one or more actions to the third user account.

7. The method of claim 5, wherein delivering the one or more items comprises displaying the digital mail, and wherein the method further comprises using the at least one hardware processor to:
record a dwell time indicating a duration that the digital mail is displaying; and
sending the recorded dwell time to the third user account.

8. The method of claim 1, wherein the new address identifier is not generated until after the address information is verified by the address verification process.

9. The method of claim 1, wherein the new address identifier is generated prior to the address information being verified by the address verification process, wherein the new address identifier is associated with a status, and wherein the method further comprises using the at least one hardware processor to:
prior to the address information being verified, set the status to indicate that verification is pending;
when the address information is verified, set the status to indicate that the address information is verified; and
when the address information is not verified, set the status to indicate that the address information was not verified.

10. The method of claim 1, wherein the address verification process comprises:
receiving an upload of an electronic document;
extracting a name and address information from the electronic document; and
in a first comparison, comparing the extracted name to a name associated with the first user account;
in a second comparison, comparing the extracted address information to the address information that was input;
verifying the address information that was input when both the first comparison and the second comparison result in a match; and
not verifying the address information that was input when either the first comparison does not result in a match or the second comparison does not result in a match.

11. The method of claim 1, wherein the address verification process comprises:
initiating printing of a code and mailing of the printed code to the address information;
receiving an input code from a user of the first user account;
comparing the input code to the code that was printed;
verifying the address information when the input code matches the code that was printed; and
not verifying the address information when the input code does not match the code that was printed.

12. The method of claim 1, wherein the address verification process comprises:
scheduling a visitation between a user of the first user account and an agent;
receiving an indication from the agent via a graphical user interface;
verifying the address information when the indication indicates that the address information should be verified; and
not verifying the address information when the indication indicates that the address information should not be verified.

13. The method of claim 1, further comprising using the at least one hardware processor to:
after completion of an initial iteration of the address verification process, assign a unique user account number to the first user account; and
initiate printing of the unique user account number on a physical card to be mailed to the address information.

14. A system comprising:
at least one hardware processor; and
one or more software modules that are configured to, when executed by the at least one hardware processor,
receive an indication for an address registration by a user of a first user account,
in response to receiving the indication, initiate an address registration process to associate the first user account with a unique address identifier by providing one or more inputs for inputting address information or inputting an old address identifier, when the address information is input for the address registration process,
  initiate an address verification process,
  generate a new address identifier as the unique address identifier,
  associate the new address identifier with the address information, and
  associate the new address identifier with the first user account,
when the old address identifier is input for the address registration process,
  initiate a linking confirmation process to obtain an approval or a denial from a second user account that is already associated with the old address identifier, and,
  when the approval is obtained from the linking confirmation process, associate the old address identifier, as the unique address identifier, with the first user account in addition to the second user account,
receive an access request, comprising the unique address identifier, from a third user account, via an application programming interface (API),
initiate an access request process to obtain an approval or a denial of the access request from one or both of the first and second user accounts associated with the unique address identifier, wherein the access request process comprises
  retrieving the one or both of the first and second user accounts associated with the unique address identifier in the access request,
  requesting the approval or the denial of the access request from a user of the one or both of the first and second user accounts, and
  receiving the approval or the denial of the access request from the user of the one or both of the first and second user accounts,
generate an access token,
associate the access token with the unique address identifier in the access request, and,
when the approval of the access request is obtained, send the access token to the third user account via the API,
after receiving the approval of the access request and sending the access token to the third user account, receive an indication to revoke the access token from the user of the one or both of the first and second user accounts, and,
in response to receiving the indication to revoke the access token, invalidate the access token such that future usage of the access token is prohibited.

15. A non-transitory computer-readable medium having instructions stored therein, wherein the instructions, when executed by a processor, cause the processor to:
receive an indication for an address registration by a user of a first user account;
in response to receiving the indication, initiate an address registration process to associate the first user account with a unique address identifier by providing one or more inputs for inputting address information or inputting an old address identifier;
when the address information is input for the address registration process,
  initiate an address verification process,
  generate a new address identifier as the unique address identifier,
  associate the new address identifier with the address information, and
  associate the new address identifier with the first user account;
when the old address identifier is input for the address registration process,
  initiate a linking confirmation process to obtain an approval or a denial from a second user account that is already associated with the old address identifier, and,
  when the approval is obtained from the linking confirmation process, associate the old address identifier, as the unique address identifier, with the first user account in addition to the second user account;
receive an access request, comprising the unique address identifier, from a third user account, via an application programming interface (API);
initiate an access request process to obtain an approval or a denial of the access request from one or both of the first and second user accounts associated with the unique address identifier, wherein the access request process comprises
  retrieving the one or both of the first and second user accounts associated with the unique address identifier in the access request,
  requesting the approval or the denial of the access request from a user of the one or both of the first and second user accounts, and
  receiving the approval or the denial of the access request from the user of the one or both of the first and second user accounts;
generate an access token;
associate the access token with the unique address identifier in the access request;
when the approval of the access request is obtained, send the access token to the third user account via the API;
after receiving the approval of the access request and sending the access token to the third user account, receive an indication to revoke the access token from the user of the one or both of the first and second user accounts; and,
in response to receiving the indication to revoke the access token, invalidate the access token such that future usage of the access token is prohibited.

* * * * *